United States Patent
Bae et al.

(10) Patent No.: US 10,862,631 B2
(45) Date of Patent: Dec. 8, 2020

(54) METHOD AND DEVICE FOR COMBINING RECEPTION SIGNALS IN WIRELESS COMMUNICATION SYSTEM

(71) Applicant: Samsung Electronics Co., Ltd., Suwon-si (KR)

(72) Inventors: Youngtaek Bae, Suwon-si (KR); Hayoung Yang, Yongin-si (KR); Joohyun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/485,072

(22) PCT Filed: Mar. 13, 2017

(86) PCT No.: PCT/KR2017/002660
§ 371 (c)(1),
(2) Date: Aug. 9, 2019

(87) PCT Pub. No.: WO2018/147500
PCT Pub. Date: Aug. 16, 2018

(65) Prior Publication Data
US 2020/0044794 A1 Feb. 6, 2020

(30) Foreign Application Priority Data
Feb. 10, 2017 (KR) .................. 10-2017-0018880

(51) Int. Cl.
*H04B 10/40* (2013.01)
*H04L 1/20* (2006.01)
*H04L 1/08* (2006.01)

(52) U.S. Cl.
CPC .................. *H04L 1/20* (2013.01); *H04L 1/08* (2013.01); *H04B 10/40* (2013.01)

(58) Field of Classification Search
USPC .......................... 375/267, 340, 347
See application file for complete search history.

(56) References Cited

U.S. PATENT DOCUMENTS 5,581,575 A 12/1996 Zehavi et al.
6,130,923 A * 10/2000 Levin .................. H04B 1/7115
375/347

(Continued)

OTHER PUBLICATIONS

Extended European Search Report dated Dec. 9, 2019, issued in a counterpart European application No. 17895586.0-1220 / 3567824.

(Continued)

*Primary Examiner* — Eva Y Puente
(74) *Attorney, Agent, or Firm* — Jefferson IP Law, LLP (57) ABSTRACT

According to an embodiment of the present invention, a method for combining reception signals of a reception device in a wireless communication system comprises the steps of: determining N (here, N is a natural number) number of symbols for performing symbol combining with respect to reception signals; symbol-combining the reception signals for L (here, L is a natural number) number of times according to the determination result; and energy-combining each group of the L number of reception signals for which the symbol combining has been performed. The present research has been performed by receiving support from "Giga KOREA project" of the Ministry of Science, ICT, and Future Planning.

11 Claims, 6 Drawing Sheets

(56) References Cited

U.S. PATENT DOCUMENTS

| | | | |
|---|---|---|---|
| 6,415,149 B1* | 7/2002 | Bevan | H04W 36/30 |
| | | | 375/347 |
| 2002/0009064 A1* | 1/2002 | Blessent | H04B 1/7113 |
| | | | 370/335 |
| 2003/0053528 A1 | 3/2003 | Wang | |
| 2004/0057530 A1* | 3/2004 | Tarokh | H04L 1/0625 |
| | | | 375/267 |
| 2005/0157822 A1* | 7/2005 | Khandekar | H04L 25/03318 |
| | | | 375/340 |
| 2009/0161733 A1 | 6/2009 | Maeda et al. | |
| 2009/0279469 A1 | 11/2009 | Wang et al. | |
| 2013/0083877 A1 | 4/2013 | Gorokhov | |
| 2014/0022982 A1 | 1/2014 | Kim et al. | |
| 2015/0012793 A1 | 1/2015 | Ryu et al. | |
| 2016/0212724 A1* | 7/2016 | Seo | H04W 56/0025 |
| 2017/0163310 A1* | 6/2017 | Haug | H04B 3/54 |

OTHER PUBLICATIONS

Jordan M T et al: "A rapid-acquisition architecture for advanced avionics and spread-spectrum applications", Oct. 15, 1990; Oct. 15, 1990-Oct. 18, 1990, Oct. 15, 1990, pp. 76-80, XP010009901.

* cited by examiner

METHOD AND DEVICE FOR COMBINING RECEPTION SIGNALS IN WIRELESS COMMUNICATION SYSTEM

TECHNICAL FIELD

In a wireless communication system, a receive signal basically consists of a transmit signal experienced a channel and a noise. In the case where the same transmit signal is repetitively transmitted in a time domain, it may be possible to improve performance of a receive device by appropriately combining the receive signals corresponding to the transmit signal. The present disclosure relates to a receive signal combining method for improving performance of a receive device and, in particular, a baseband digital signal processing technology field.

This research was conducted with support from the "Government-wide Giga KOREA project" led by the Ministry of Science, ICT, and Future Planning.

BACKGROUND ART

In a wireless communication system, receive signal combining methods fall into one of a symbol combining technique and an energy combining technique.

The symbol combining technique is characterized by combining received signals in units of symbols and achieving a processing gain of a signal-to-noise ratio (SNR) that increases in accordance with the number of signals being combined in a non-varying channel environment such as an additive white Gaussian noise (AWGN) environment.

Meanwhile, the energy combining technique is characterized by simply combining powers of the receive signals to, although not to increase the SNR, decrease a variance of noise on a fading channel as well as an AWGN channel, thereby improving performance.

In the case of the symbol combining technique, if an accumulative period increases on the fading channel, this is likely to cause a performance degradation because of the averaging effect. In order to avoid such performance degradation of the symbol combining technique, there is a need to perform channel estimation and apply an estimated channel value to a received signal again to compensate a phase of the channel.

However, the channel estimation accuracy drops in a low SNR operation region, which leads to failure of the achievement of a theoretically achievable performance gain. Meanwhile, the energy combining technique has an advantage of obviating the need of channel estimation, but it also has a shortcoming of no processing gain.

DISCLOSURE OF INVENTION

Technical Problem

In order to solve the above problems, the disclosure proposes a hybrid combining method that is capable of encompassing the advantageous of the symbol combining and energy combining techniques.

The disclosure proposes a hybrid combining method that is capable of improving receiver performance even in an environment where channel estimation is difficult.

Solution to Problem

According to an embodiment of the disclosure, a receive signal combining method of a receive device in a wireless communication system includes determining N symbols (here, N is a natural number) for performing symbol combining on receive signals, performing the symbol combining on the receive signals during L periods (here, L is a natural number) according to a result of the determination, and performing energy combining on L receive signal groups in which the symbol combining has been performed.

Preferably, the receive signal groups are each a receive signal produced by combining the N symbols. Preferably, the receive signals are modeled based on a channel status, a transmit signal, and a noise.

Preferably, determining the N symbols includes calculating a metric value for the symbol combining with a first signal produced by combining up to a Kth receive signal (here, K is a natural number) and a second signal as a (K+1)th receive signal and selecting N based on a real number of the metric value being equal to or greater than 0 at N and negative at N+1.

Preferably, determining the N symbols includes calculating a sum of cross-correlations between consecutive symbols, normalizing the sum of the cross-correlations, and selecting N based on a real number of the sum of the cross-correlations, the sum normalized at N being equal to or greater than a predetermined threshold value.

Preferably, the threshold value is a programmable value.

Preferably, the receive device is a receiver of a first base station and receives a downlink channel of a second base station, and the receive signals are synchronization signals.

Preferably, the receive device is a receiver for receiving a signal being repetitively transmitted by a machine type communication (MTC) terminal through an uplink channel.

According to an embodiment of the disclosure, a receive device of combining receive signals in a wireless communication system includes a transceiver configured to transmit and receive signals and a controller configured to control to determine N symbols (here, N is a natural number) for performing symbol combining on receive signals, perform the symbol combining on the receive signals during L periods (here, L is a natural number) according to a result of the determination, and perform energy combining on L receive signal groups in which the symbol combining has been performed.

Advantageous Effects of Invention

The receive signal combining method of the disclosure is advantageous in terms of providing a hybrid combining technique that is capable of combining receive signals while gaining advantages of both the symbol combining and energy combining techniques.

The receive signal combining method of the disclosure is advantageous in terms of improving receiver performance even in an environment where channel estimation is difficult.

MODE FOR THE INVENTION

Exemplary embodiments of the present invention are described in detail with reference to the accompanying drawings. The same reference numbers are used throughout the drawings to refer to the same or like parts. Detailed descriptions of well-known functions and structures incorporated herein may be omitted to avoid obscuring the subject matter of the present invention.

Detailed descriptions of technical specifications well-known in the art and unrelated directly to the present invention may be omitted to avoid obscuring the subject matter of the present invention. This aims to omit unnecessary description so as to make clear the subject matter of the present invention.

For the same reason, some elements are exaggerated, omitted, or simplified in the drawings and, in practice, the elements may have sizes and/or shapes different from those shown in the drawings. Throughout the drawings, the same or equivalent parts are indicated by the same reference numbers.

Advantages and features of the disclosure and methods of accomplishing the same may be understood more readily by reference to the following detailed descriptions of exemplary embodiments and the accompanying drawings. The disclosure may, however, be embodied in many different forms and should not be construed as being limited to the exemplary embodiments set forth herein; rather, these exemplary embodiments are provided so that this disclosure will be thorough and complete and will fully convey the concept of the disclosure to those skilled in the art, and the disclosure will only be defined by the appended claims. Like reference numerals refer to like elements throughout the specification.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions that are executed via the processor of the computer or other programmable data processing apparatus create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce articles of manufacture embedding instruction means that implement the function/act specified in the flowcharts and/or block diagrams. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions/acts specified in the flowcharts and/or block diagrams.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time, or they may be performed in reverse order according to their functions.

According to various embodiments of the disclosure, the term "module", means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionalities of the components and modules may be combined into fewer components and modules or further separated into more components and modules. In addition, the components and modules may be implemented such that they execute one or more CPUs in a device or a secure multimedia card.

The embodiments of the disclosure are described in detail with reference to the accompanying drawings. Detailed descriptions of well-known functions and structures incorporated herein may be omitted to avoid obscuring the subject matter of the disclosure. Further, the following terms are defined in consideration of the functionality in the disclosure, and they may vary according to the intention of a user or an operator, usage, etc.

Figure 1:
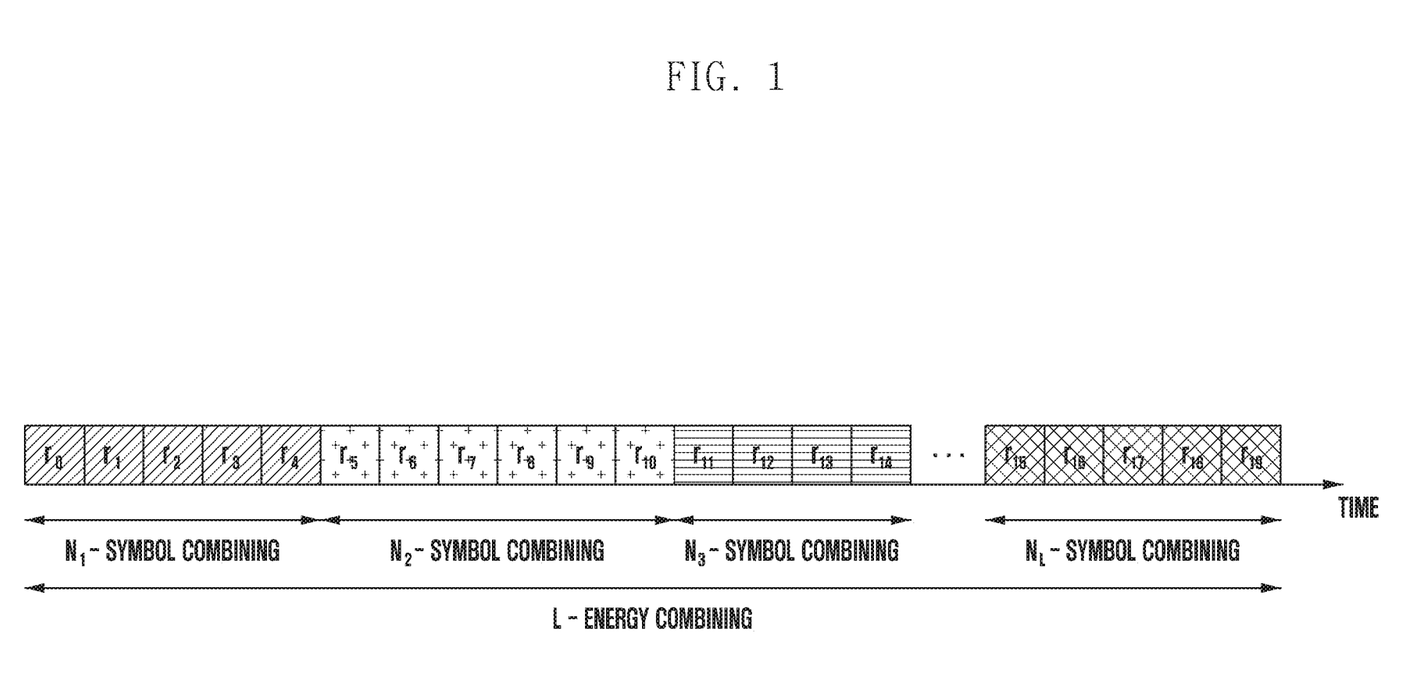
FIG. 1 is a diagram for explaining a hybrid combining technique according to an embodiment of the disclosure.

FIG. 1 is a diagram for explaining a hybrid combining technique according to an embodiment of the disclosure.

In reference to FIG. 1, a receive device may perform symbol combining during each Ni period, after performing the symbol combining L times (N1~NL), perform energy combining on each of L groups of received signals (L-energy combining).

For example, the receive device may symbol-combine 5 receive signals (r0~r4) during a first period (N1), 6 receive signals (r5~r10) during a second period (N2), 4 receive signals (r11~r14) during a third period (N3), and 5 receive signals (r15~r19) during an Lth period (NL).

In the disclosure, a symbol combining period $N_i$ may be determined in real time or adaptively according to a metric being calculated with the receive signals.

Next, the receive device may perform energy combining over all of a first group (r0~r4), a second group (r5~r10), a third group (r11~r14), and an Lth group (r15~r19), which are symbol-combined.

Before undertaking the detailed description of the disclosure, brief descriptions are made of the symbol combining and energy combining techniques for convenience of explanation.

First, a $n^{th}$ receive signal ($r_n$) is modeled by Equation 1.

$$r_n = h_n x_n + z_n \qquad \text{Equation 1}$$

In Equation 1, $h_n$ denotes a channel formed using a Complex Gaussian Random Variable {ComplexNorm(0.1)} with a zero mean and a unit variance ($\sigma_n^2 = 1$), and $z_n$ denotes a noise component drawn from a distribution with a unit variance ($\sigma_z^2=1$). In Equation 1, $x_n$ denotes a transmit signal on a unit circle, i.e., a pilot signal or known signal.

Descriptions are made of the basic concepts of the symbol combining and energy combining techniques hereinafter using equations under the assumption of an AWGN channel ($h_n=h$).

$r_n=hx_n+z_n$:Received Signal $y_n=r_n x_n^*=h+z_n x_n^*=h+w_n$:De-correlation with Known Signal    Equation 2

The two combining techniques for signals after decorrelation are described with reference to Equations 3 and 4 as follows.

First, the symbol combining may be performed on decorrelated symbols as expressed by Equation 3.

$$\sum_{n=0}^{N-1} y_n = Nh + \sum_{n=0}^{N-1} w_n \quad \text{Equation 3}$$

In Equation 3, $N^2\sigma_h^2$ denotes a power of a signal component, and $N^2\sigma_w^2$ denotes a power of a noise component. Accordingly, if the channel does not change, as with an AWGN channel, during N combining periods, a combined SNR becomes N*SNR, which leads to achievement of a processing gain.

Next, the energy combining may be performed on the decorrelated symbols as expressed by Equation 4.

$$\sum_{n=0}^{N-1} |y_n|^2 = \sum_{n=0}^{N-1} |h+w_n|^2 \quad \text{Equation 4}$$

Figure 4:
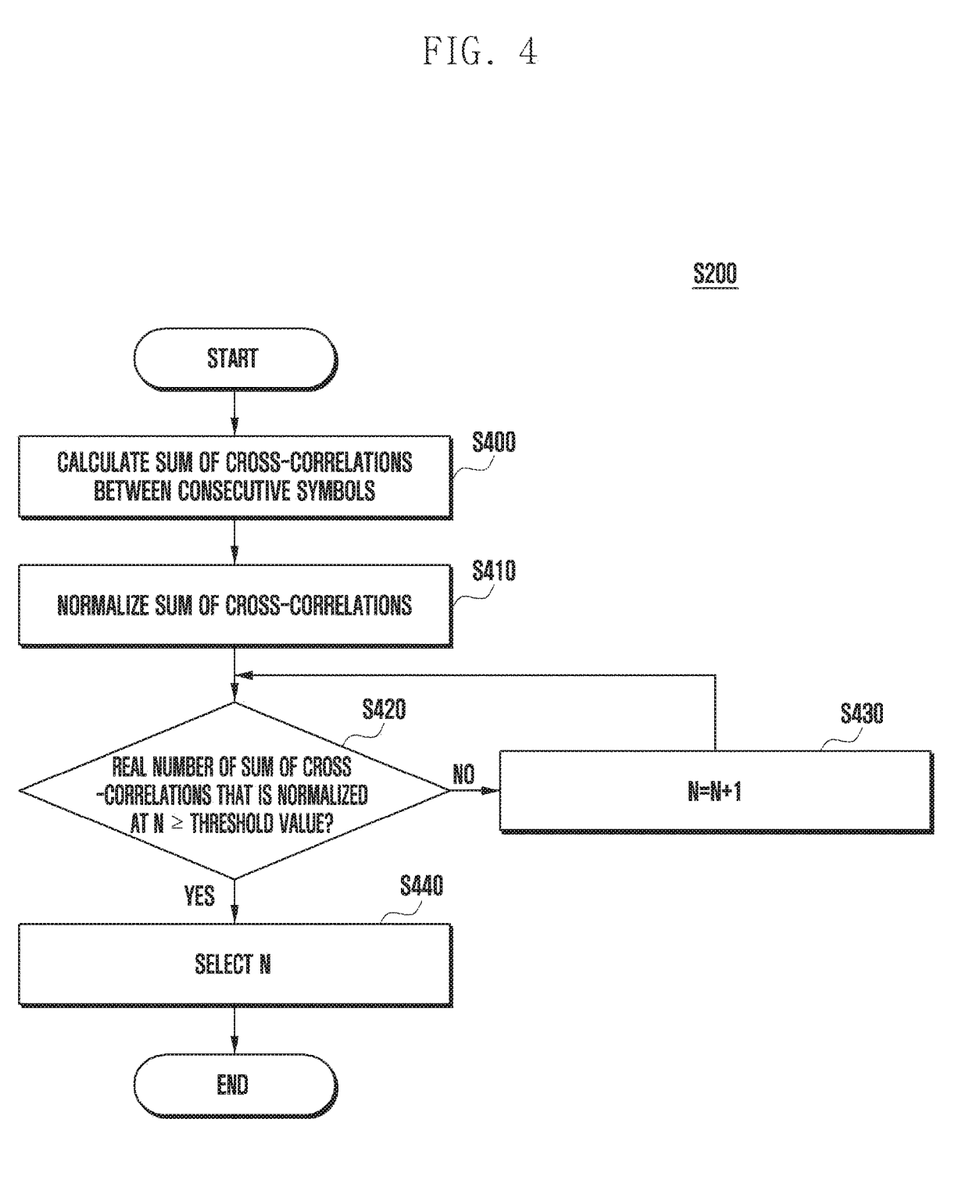
FIG. 4 is a flowchart illustrating a procedure for determining the number of symbols for performing symbol combining in FIG. 2 according to another embodiment of the disclosure.

In FIG. 4, $N^2\sigma_h^2$ denotes a power of a signal component, and $N^2\sigma_w^2$ denotes a power of a noise component. Accordingly, if the channel does not change, as with an AWGN channel, during N combining periods, a combined SNR simply becomes SNR, which means there is no processing gain. Nevertheless, the energy combining provides a performance gain of reducing the variance of the noise component. A more detailed description thereof is made below.

After splitting a noise component into real number and imaginary number parts, assuming the real number and imaginary number parts as each being Real Gaussian Random Variables {Norm(0.1)}, they may be expressed by Equation 5.

$$w_n = \frac{1}{\sqrt{2}}(w_n^R + jw_n^I),\ w_n^R \sim w_n^I \sim Norm(0, 1) \quad \text{Equation 5}$$

$$\bar{w} = \frac{1}{N}\sum_{n=0}^{N-1} |w_n|^2 = \frac{1}{2N} \underbrace{\sum_{n=0}^{N-1} |w_n^R|^2 + |w_n^I|^2}_{2N\text{-order chisquare}=\chi^2(2N)}$$

In Equation 5, $\chi^2(2N)$ denotes a difference Chi-square distribution of which the average is 2N and the variance is 4N; this means that has a mean of 1 and a variance of 1/N. [Reference: If the value N increases to infinity, $$\bar{w} \xrightarrow[N\to\infty]{} Norm(1, 1/N)]$$

That is, as the number of accumulations doubles, the variance of the noise is halved and, if the number of accumulations increases significantly, is proximate to the Gaussian distribution.

The hybrid combining technique characterized by performing the symbol combining during every period Ni and energy combining during L periods may be expressed by Equation 6.

$$\sum_{i=0}^{L-1}\left|\sum_{n=0}^{N_i-1} y_n\right|^2 = \sum_{i=0}^{L-1}\left|N_i h + \sum_{n=0}^{N_i-1} w_n\right|^2 \quad \text{Equation 6}$$

Figure 6:
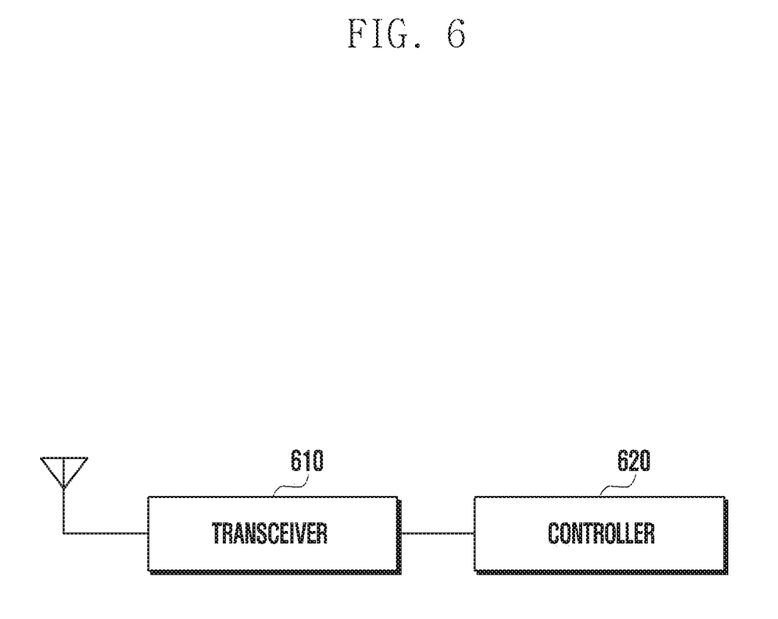
FIG. 6 is a block diagram illustrating a configuration of a receive device according to an embodiment of the disclosure.

In FIG. 6, $$\sigma_h^2 \underset{i=0}{\overset{L-1}{Q}} N_i^2$$

denotes a power of a signal component, and $$\sigma_w^2 \underset{i=0}{\overset{L-1}{Q}} N_i$$

denotes a power of a noise component. Accordingly, if $N_i=\bar{N}$, the combined SNR becomes $\bar{N}$ESNR, which leads to achievement of a processing gain through energy combining. It may also be possible to achieve a variance reduction gain of the noise component through energy combining. By adjusting these values (Ni) appropriately for the channel condition, it is possible to take only advantages of the two combining techniques.

<Fading Channel: Single-Carrier Viewpoint>

A description is made of the method for applying a hybrid combining technique on a fading channel from the viewpoint of single-carrier.

$r_n=h_n x_n+z_n$ $y_n=r_n x_n^*=h_n+z_n x_n^*=h_n+w_n \quad \text{Equation 7}$

If N=2, the symbol combining may be expressed as Equation 8.

$$|y_0 + y_1|^2 = |y_0|^2 + |y_1|^2 + 2\text{Re}\{y_0 y_1^*\} = \quad \text{Equation 8}$$
$$|h_0|^2 + |w_0|^2 + |h_1|^2 + |w_1|^2 + 2\text{Re}\{h_0 w_0^*\} + 2\text{Re}\{h_1 w_1^*\} +$$
$$2\text{Re}\{h_0 h_1^*\} + 2\text{Re}\{h_0 w_1^*\} + 2\text{Re}\{w_0 h_1^*\} + 2\text{Re}\{w_0 w_1^*\}$$

If N=2, the energy combining may be expressed as Equation 9.

$|y_0|^2+|y_1|^2=|h_0|^2+|w_0|^2+|h_1|^2+|w_1|^2+2\ \text{Re}\ \{h_0 w_0^*\}+2\ \text{Re}\ \{h_1 w_1^*\}$    Equation 9

Accordingly, comparing Equations 8 and 9, if 2 Re $\{y_0 y_1^*\}=2$ Re $\{h_0 h_1^*\}+2$ Re $\{h_0 w_1^*\}+2$ Re $\{w_0 h_1^*\}+2$ Re $\{w_0 w_1^*\}$ is a positive value, the symbol combining is advantageous.

If N is a typical value, the symbol combining may be expressed as Equation 10.

$$\left|\sum_{n=0}^{N-1} y_n\right|^2 = \sum_{n=0}^{N-1} |y_n|^2 + 2\sum_{i<j} \text{Re}\{y_i y_j^*\} = \quad \text{Equation 10}$$

$$\sum_{n=0}^{N-1} |h_n|^2 + \sum_{n=0}^{N-1} |w_n|^2 + 2\sum_{n=0}^{N-1} \text{Re}\{h_n w_n^*\} + 2\sum_{i<j} \text{Re}\{h_i h_j^*\} +$$

$$2\sum_{i<j} \text{Re}\{h_i w_j^*\} + 2\sum_{i<j} \text{Re}\{w_i h_j^*\} + 2\sum_{i<j} \text{Re}\{w_i w_j^*\}$$

If N is a typical value, the energy combining may be expressed as Equation 11.

$$\sum_{n=0}^{N-1} |y_n|^2 = \quad \text{Equation 11}$$

$$\sum_{n=0}^{N-1} |h_n + w_n|^2 = \sum_{n=0}^{N-1} |h_n|^2 + \sum_{n=0}^{N-1} |w_n|^2 + 2\sum_{n=0}^{N-1} \text{Re}\{h_n w_n^*\}$$

With reference to Equations 10 and 11, if $$2\sum_{i<j} \text{Re}\{y_i y_j^*\} =$$

$$2\sum_{i<j} \text{Re}\{h_i h_j^*\} + 2\sum_{i<j} \text{Re}\{h_i w_j^*\} + 2\sum_{i<j} \text{Re}\{w_i h_j^*\} + 2\sum_{i<j} \text{Re}\{w_i w_j^*\}$$

is a positive value, the symbol combining is advantageous. This equation may be written as Equations 12 to 14.

$$2\sum_{i<j} \text{Re}\{y_i y_j^*\} = 2\text{Re}\left\{\sum_{i<j} y_i y_j^*\right\} \quad \text{Equation 12}$$

$$\sum_{i<j} y_i y_j^* = y_0 y_1^* + y_0 y_2^* + \ldots + y_0 y_{N-1}^* + \quad \text{Equation 13}$$

$$y_1 y_2^* + \ldots + y_1 Y_{N-1}^*$$

$$\ddots \quad \vdots$$

$$+ y_{N-1} y_{N-1}^*$$

$$\sum_{i<j} y_i y_j^* = y_0 y_1^* + (y_0 + y_1) y_2^* + (y_0 + y_1 + y_2) y_3^* + \ldots + \quad \text{Equation 14}$$

$$(y_0 + \ldots + y_{N-2}) y_{N-1}^*$$

$$= Y_0 y_1^* + Y_1 y_2^* + Y_2 y_3^* + \ldots + Y_{N-2} y_{N-1}^*$$

$$\equiv S_{N-1}$$

With reference to Equations 12 to 14, $Y_{n-1}$ denotes a signal produced by combining up to the $(n-1)^{th}$ symbol, and $y_n$ denotes the $n^{th}$ receive signal. $S_{n-1}$ denotes a metric value for combining up to the $(n-1)^{th}$ symbol.

Accordingly, if $\text{Re}\{S_{N-1}\}E^0$ and $\text{Re}\{S_n\}Z^0$, symbol combining is applied up to the $(N-1)^{th}$ symbol. However, because the $$2\sum_{i<j} \text{Re}\{h_i w_j^*\} + 2\sum_{i<j} \text{Re}\{w_i h_j^*\} + 2\sum_{i<j} \text{Re}\{w_i w_j^*\}$$

part of the above equation corresponds to noise, a problem arises in that noise increases; in the case of determining a signal quality by applying a threshold value changing in proportion to the noise amount, a problem arises in the combining decision-making method based on simply whether the real numbers of $S_{N-1}$ and $S_N$ are positive or negative numbers.

As another approach, use of a value obtained by accumulating (or averaging) change amounts of the Zn value itself with $Y_{n-1} y_n^* = Z_n$ instead of the SN-1 value can be considered. This is based on the basic idea that the symbol combining is advantages for the case where the change amount is small.

$$Z_1 = y_0 y_1^* \quad \text{Equation 15}$$

$$Z_2 = (y_0 + y_1) y_2^*$$

$$\vdots$$

$$Z_{n-1} = (y_0 + \ldots + y_{n-2}) y_{n-1}^*$$

$$Z_n = (y_0 + \ldots + y_{n-2} + y_{n-1}) y_n^*$$

Assuming that a change between two consecutive symbols is small, it may be kept as $y_{n-1}(y_n$, and the change amount of the Zn value may satisfy a relationship of Equation 16 below.

$$Z_n - Z_{n-1} \approx y_{n-1} y_n^* \quad \text{Equation 16}$$

Each of the change amounts may be calculated and summed as expressed by Equation 17.

$$Z_2 - Z_1 \approx y_1 y_2^* \quad \text{Equation 17}$$

$$Z_3 - Z_2 \approx y_2 y_3^*$$

$$\vdots$$

$$Z_n - Z_{n-1} \approx y_{n-1} y_n^*$$

The items of Equation 17 may be summed and expressed as Equation 18.

$$Z_n - Z_1 \approx y_1 y_2^* + y_2 y_3^* + \ldots + y_{n-1} y_n^* \quad \text{Equation 18}$$

That is, it is observed that $Z_n \approx y_0 y_1^* + y_1 y_2^* + y_2 y_3^* + \ldots + y_{n-1} y_n^*$ to find the sum of cross-correlations between consecutive symbols.

In the disclosure, a new metric Xn is defined as in Equation 19 using the fact that the above equation is in use for measuring a cross-correlation degree, and the symbol combining is selected and performed only when Xn is equal to or greater than a predetermined value.

Symbol Combining up to $n^{th}$ symbol if $$X_n = \text{Re}\left\{\frac{Y_{n-1} y_n^*}{\sqrt{Y_{n-1}} \sqrt{y_n^*}}\right\} \geq \gamma \quad \text{Equation 19}$$

Typically, if the real number of the cross-correlation normalized as above is equal to or greater than a predetermined value (e.g., 0.8), it is regarded as having a strong correlation. However, r is put as a variable so as to be determined according to a situation for optimization rather than a fixed value.

<Fading Channel: Multi-Carrier Viewpoint (e.g. OFDM)>

A description is made of the method for applying a hybrid combining technique on a fading channel from the viewpoint of multicarrier.

$$r_{n,k} = h_{n,k} x_{n,k} + z_{n,k}$$

$$y_{n,k} = r_{n,k} x_{n,k}^* = h_{n,k} + z_{n,k} x_{n,k}^* = h_{n,k} + w_{n,k} \quad \text{Equation 20}$$

In reference to Equation 20, a signal is modeled to have a subscript k indicative of the frequency axis as well as a subscript n indicative of the time axis.

If N=2, the symbol combining may be expressed as Equation 21.

$$|y_{0,k} + y_{1,k}|^2 = |y_{0,k}|^2 + |y_{1,k}|^2 + 2\text{Re}\{y_{0,k} y_{1,k}^*\} \quad \text{Equation 21}$$

$$= |h_{0,k}|^2 + |w_{0,k}|^2 + |h_{1,k}|^2 + |w_{1,k}|^2 +$$
$$2\text{Re}\{h_{0,k} w_{0,k}^*\} + 2\text{Re}\{h_{1,k} w_{1,k}^*\} +$$
$$2\text{Re}\{h_{0,k} h_{1,k}^*\} + 2\text{Re}\{h_{0,k} w_{1,k}^*\} +$$
$$2\text{Re}\{w_{0,k} h_{1,k}^*\} + 2\text{Re}\{w_{0,k} w_{1,k}^*\}$$

If N=2, the energy combining may be expressed as Equation 22.

$$|y_{0,k}|^2 + |y_{1,k}|^2 = |h_{0,k}|^2 + |w_{0,k}|^2 + |h_{1,k}|^2 + |w_{1,k}|^2 + 2\text{Re}\{h_{0,k} w_{0,k}^*\} + 2\text{Re}\{h_{1,k} w_{1,k}^*\} \quad \text{Equation 22}$$

In reference to Equations 21 and 22, if $2\text{Re}\{y_{0,k} y_{1,k}^*\} = 2\text{Re}\{h_{0,k} h_{1,k}^*\} + 2\text{Re}\{h_{0,k} w_{1,k}^*\} + 2\text{Re}\{w_{0,k} h_{1,k}^*\} + 2\text{Re}\{w_{0,k} w_{1,k}^*\}$ is a positive value, the symbol combining is advantageous.

If N is a typical value, the symbol combining may be expressed as Equation 23.

$$\left|\sum_{n=0}^{N-1} y_{n,k}\right|^2 = \sum_{n=0}^{N-1} |y_{n,k}|^2 + 2\sum_{i<j} \text{Re}\{y_{i,k} y_{j,k}^*\} \quad \text{Equation 23}$$

$$= \sum_{n=0}^{N-1} |h_{n,k}|^2 + \sum_{n=0}^{N-1} |w_{n,k}|^2 + 2\sum_{n=0}^{N-1} \text{Re}\{h_{n,k} w_{n,k}^*\} +$$
$$2\sum_{i<j} \text{Re}\{h_{i,k} h_{j,k}^*\} + 2\sum_{i<j} \text{Re}\{h_{i,k} w_{j,k}^*\} +$$
$$2\sum_{i<j} \text{Re}\{w_{i,k} h_{j,k}^*\} + 2\sum_{i<j} \text{Re}\{w_{i,k} w_{j,k}^*\}$$

If N is a typical value, the energy combining may be expressed as Equation 24.

$$\sum_{n=0}^{N-1} |y_{n,k}|^2 = \sum_{n=0}^{N-1} |h_{n,k} + w_{n,k}|^2 = \quad \text{Equation 24}$$

$$\sum_{n=0}^{N-1} |h_{n,k}|^2 + \sum_{n=0}^{N-1} |w_{n,k}|^2 + 2\sum_{n=0}^{N-1} \text{Re}\{h_{n,k} w_{n,k}^*\}$$

In reference to Equations 23 and 24, if $$2\sum_{i<j} \text{Re}\{y_{i,k} y_{j,k}^*\} =$$

$$2\sum_{i<j} \text{Re}\{h_{i,k} h_{j,k}^*\} + 2\sum_{i<j} \text{Re}\{h_{i,k} w_{j,k}^*\} + 2\sum_{i<j} \text{Re}\{w_{i,k} h_{j,k}^*\} + 2\sum_{i<j} \text{Re}\{w_{i,k} w_{j,k}^*\}$$

is a positive value, the symbol combining is advantageous. This equation may be written as Equations 25 and 26 as in the single carrier model.

$$2\sum_{k=0}^{K-1} \sum_{i<j} \text{Re}\{y_{i,k} y_{j,k}^*\} = \quad \text{Equation 25}$$

$$2\sum_{i<j} \text{Re}\left\{\sum_{k=0}^{K-1} y_{i,k} y_{j,k}^*\right\} = 2\sum_{i<j} \text{Re}\{\vec{y}_i \cdot \vec{y}_j^*\}$$

$$\sum_{i<j} \vec{y}_i \cdot \vec{y}_j^* = \vec{y}_0 \cdot \vec{y}_1^* + (\vec{y}_0 + \vec{y}_1) \cdot \vec{y}_2^* + (\vec{y}_0 + \vec{y}_1 + \vec{y}_2) \cdot \quad \text{Equation 26}$$

$$\vec{y}_3^* + \ldots + (\vec{y}_0 + \ldots + \vec{y}_{N-2}) \cdot \vec{y}_{N-1}^*$$

$$= \vec{Y}_0 \cdot \vec{y}_1^* + \vec{Y}_1 \cdot \vec{y}_2^* + \vec{Y}_2 \cdot \vec{y}_3^* + \ldots + \vec{Y}_{N-2} \cdot \vec{y}_{N-1}^*$$

$$\equiv S_{N-1}$$

In reference to Equations 25 and 26, the arrow above a variable denotes a frequency direction vector, and (E) denotes an inner product. Likewise, $\vec{Y}_{n-1}$ denotes a signal produced by performing symbol combining up to the $(n-1)^{th}$ symbol, and $\vec{Y}_n$ denotes the $n^{th}$ receive signal. If $\text{Re}\{S_{n-1}\}E^0$ and $\text{Re}\{S_n\}<0$, symbol combining is applied up to the $(N-1)^{th}$ symbol Because the $$2\sum_{i<j} \text{Re}\{h_{i,k} w_{j,k}^*\} + 2\sum_{i<j} \text{Re}\{w_{i,k} h_{j,k}^*\} + 2\sum_{i<j} \text{Re}\{w_{i,k} w_{j,k}^*\}$$

part of the above equation corresponds to noise, a problem arises in that noise increases; in the case of determining a signal quality by applying a threshold value changing in proportion to the noise amount, a problem arises in the combining decision-making method based on simply whether the real numbers of $S_{N-1}$ and $S_N$ are positive or negative numbers. Accordingly, a cross-correlation degree is measured to find a symbol combining period as Equation 27 as in the single carrier model.

Symbol Combining up to $n^{th}$ symbol if $$X_n = \text{Re}\left\{\frac{Y_{n-1} y_n^*}{\sqrt{Y_{n-1}} \sqrt{y_n^*}}\right\} \geq \gamma \quad \text{Equation 27}$$

That is, in the multicarrier model, it is possible to apply the same method as used in the single carrier model using the inner product of the frequency direction vector.

The hybrid combining technique of the disclosure that takes the advantages of both the symbol combining and energy combining techniques is capable of improving a receiver performance even in an environment where channel estimation is difficult.

Given that an over-the-air rekeying (OTAR) receiver (for a base station to receive a downlink channel from another base station) of an LTE system requires securing a synchronization and cell ID detection performance with a high reliability even in a very low SNR operation region (e.g., SNR=−20 dB), there is a need to accumulate synchronization signals (PSS/SSS) during a period of several subframes in the time domain to satisfy such a requirement.

In the case where it is necessary to estimate information of neighboring base stations as in the OTAR receiver, it is possible to apply the symbol combining technique during a long period because there is little change of channel variation with the fixed base station. Given that only the energy combining technique is mostly used because of the channel estimation inaccuracy in a low SNR region, the hybrid combining technique is capable of achieving additional processing gain by appropriately controlling Ni value.

The hybrid combining technique may also be applied to a different situation such as LTE enhanced Machine Type Communication (LTE eMTCC) where a base station combines signals being transmitted by an eMTCC terminal to achieve a performance gain.

The symbol combining and energy combining techniques of the disclosure may be directly applied to a physical random access channel (PRACH) on which presence/absence of a signal should be detected.

The symbol combining technique of the disclosure may also be applied, along with a log-likelihood ratio (LLR) combining technique, to a physical uplink shared channel (PUSCH)/physical uplink control channel (PUCCH) to achieve a performance gain.

In this case, the key point is to determine a symbol combining period, in units of subframes, for combining symbols therein, and the method of the disclosure is advantageous in terms of determining the symbol combining period in adaptation to a transmission/reception channel.

Figure 2:
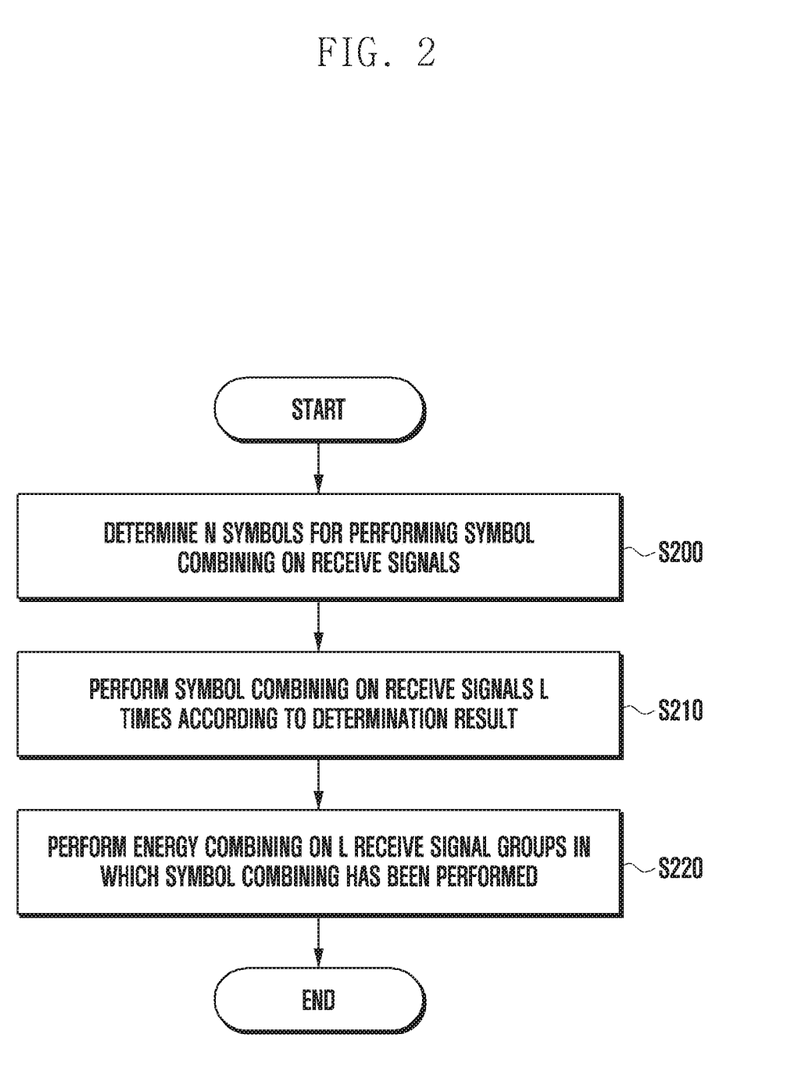
FIG. 2 is a flowchart illustrating a hybrid combining method according to an embodiment of the disclosure.

FIG. 2 is a flowchart illustrating a hybrid combining method according to an embodiment of the disclosure.

At step S200, a receive device may determine a number of symbols N for performing symbol combining on receive signals. Here, N is a natural number.

At step S210, the receive device may perform symbol combining on the receive signals L times according to a result of the determination. Here, L is a natural number.

At step S220, the receive device may perform energy combining on L receive signal groups in which the symbol combining has been performed.

Figure 3:
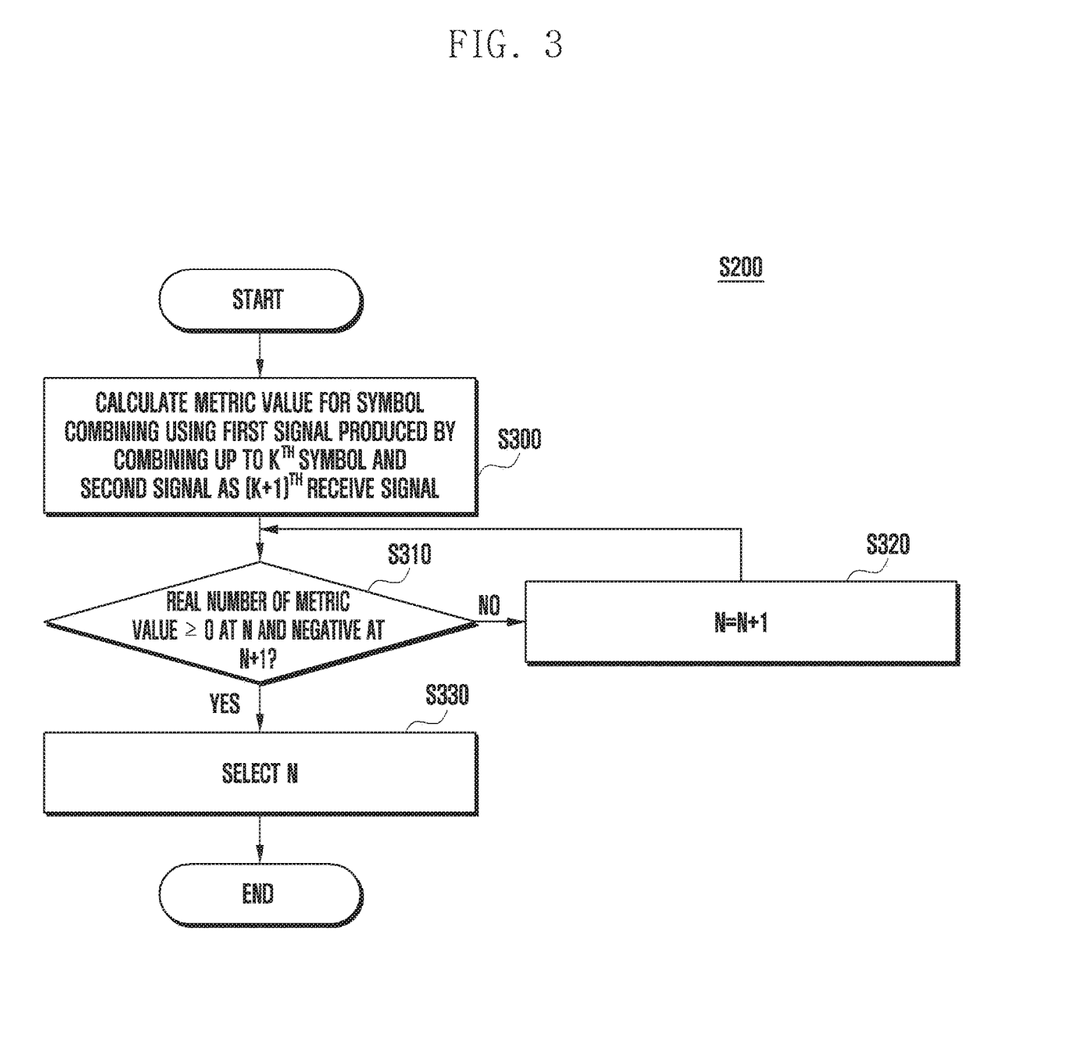
FIG. 3 is a flowchart illustrating a procedure for determining the number of symbols for performing symbol combining in FIG. 2 according to an embodiment of the disclosure.

FIG. 3 is a flowchart illustrating a procedure for determining the number of symbols for performing symbol combining in FIG. 2 according to an embodiment of the disclosure.

At step S300, the receive device may calculate a metric value for symbol combining with a first signal obtained by combining up to a $K^{th}$ receive signal and a second signal as the $(K+1)^{th}$ receive signal. Here, K is a natural number.

At step S310, the receive device may determine whether a real number of the metric value is equal to or greater than 0 at N and negative at N+1.

If it is determined at step S310 that the real number of the metric value is equal to or greater than 0 at N and not negative at N+1, the receive device may increment N by 1 (N=N+1) at step S320.

If it is determined at step S310 that the real number of the metric value is equal to or greater than N and negative at N+1, the receive device may select N at step S330.

FIG. 4 is a flowchart illustrating a procedure for determining the number of symbols for performing symbol combining in FIG. 2 according to another embodiment of the disclosure.

At step S400, a receive device may calculate a sum of cross-correlations between consecutive symbols.

At step 410, the receive device may normalize the sum of the cross-correlations.

At step S420, the receive device may determine whether a real number of the sum of the cross-correlations that has been normalized at N is equal to or greater than a predetermined threshold value.

If it is determined at step S420 that the real number of the sum of the cross-correlations that has been normalized at N is neither equal to nor greater than the predetermined threshold value, the receive device may increment N by 1 (N=N+1) at step S430.

If it is determined at step S420 that the real number of the sum of the cross-correlations that has been normalized at N is equal to or greater than the predetermined threshold value, the receive device may select N at step S440.

Figure 5:
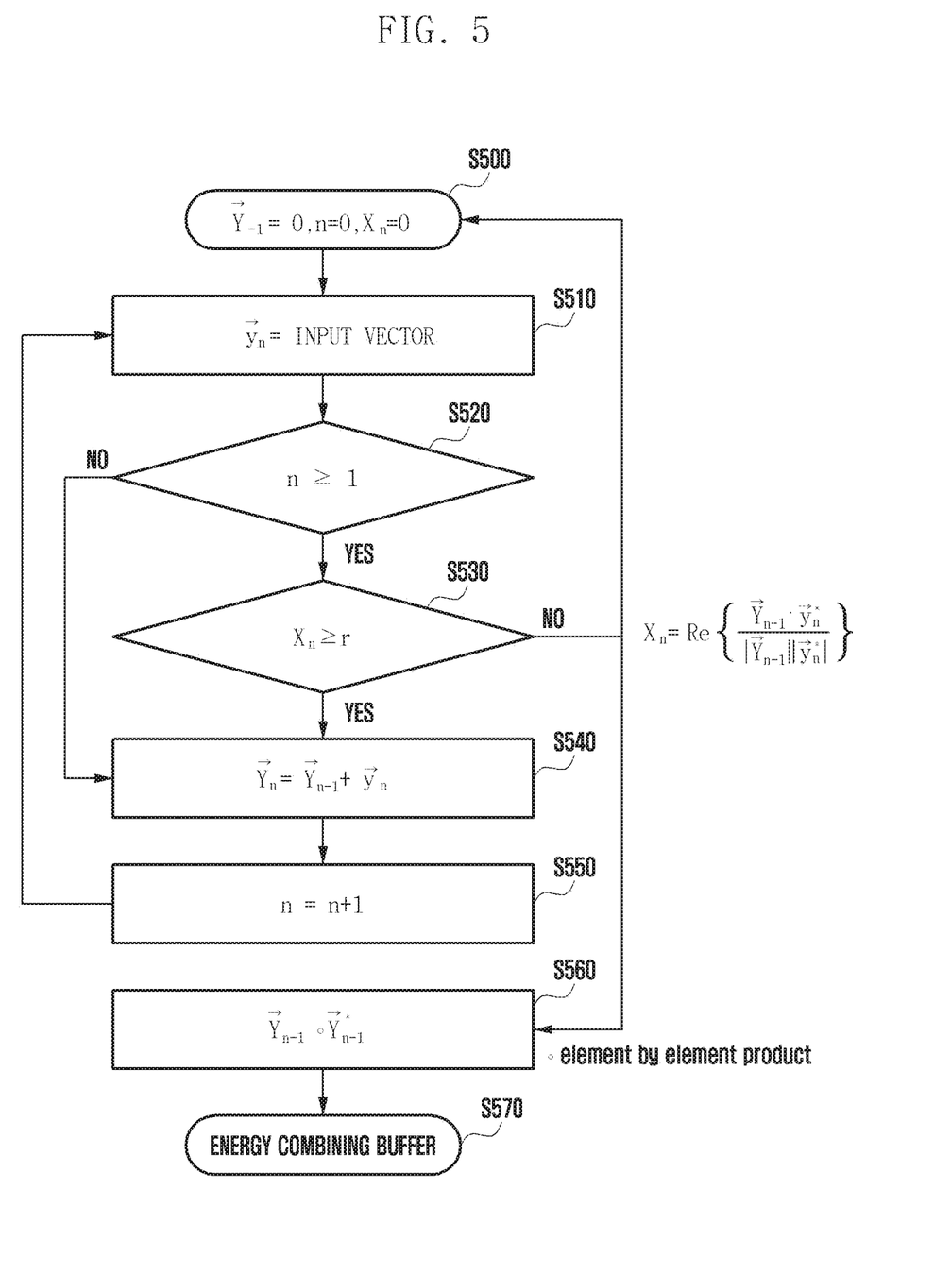
FIG. 5 is a flowchart for more clearly explaining the procedure of FIG. 4 with mathematical formulas according to an embodiment of the disclosure.

FIG. 5 is a flowchart for more clearly explaining the procedure of FIG. 4 with mathematical formulas according to an embodiment of the disclosure.

At step S500 as an initialization step, the receive device sets each of a vector $\vec{Y}_{-1}$ and two variables n and Xn to 0 ($\vec{Y}_{-1}=0$, n=0, and Xn=0). At step S510, $\vec{y}_n$ is an input vector. The receive device determines at step S520 whether n≥1 is fulfilled and at step S530 whether $X_n \geq r$ is fulfilled.

Here, $X_n$ denotes a metric defined in consideration of cross-correlations between consecutive symbols as described above, and r denotes a predetermined threshold value. And $X_n$ may be defined as Equation 28.

$$X_n = \operatorname{Re}\left\{\frac{\vec{Y}_{n-1} \cdot \vec{y}_n^*}{|\vec{Y}_{n-1}||\vec{y}_n^*|}\right\}$$

Equation 28

If it is determined at step S520 that n≥1 is not fulfilled or at step S530 that $X_n \geq r$ is fulfilled, the receive device performs calculation of $\vec{Y}_n = \vec{Y}_{n-1} + \vec{y}_n$ at step S540.

The receive device performs a calculation of n=n+1 at step S550 and a calculation of $\vec{Y}_{n-1} \circ \vec{Y}_{n-1}^*$ (which means an element-by-element product) at step S560.

At step S570, the receive device may perform energy combining buffering. Here, if a result of the determination at step S530 becomes "No" according to the metric in the state where the symbol combining is continuously performed, the receive device may stop the symbol combining and calculate and store the energy of the combined receive signals in an energy combining buffer.

FIG. 6 is a block diagram illustrating a configuration of a receive device according to an embodiment of the disclosure.

In reference to FIG. 6, the receive device may include a transceiver 610 and a controller 620.

The transceiver may be connected to the controller 620 and transmit or receive information necessary for performing a hybrid combining on receive signals.

The controller 620 may determine N symbols (here, N is a natural number) for performing symbol combining on the receive signals, perform symbol combining on the receive signals during L periods (here, L is a natural number) according to a result of the determination, and perform energy combining on L receive signal groups in which the symbol combining has been performed.

Here, each of the receive signal groups may be the receive signal that has been symbol-combined with N symbols.

The receive signal may be modeled based on a channel status, a transmit signal, and a noise.

According to an embodiment, the controller may calculate a metric value for the symbol combining using a first signal obtained by combining up to a $K^{th}$ receive signal and a second signal as the $(K+1)^{th}$ receive signal. Afterward, if the real number of the metric value is equal to or greater than 0 at N and negative at N+1, the controller may select N.

According to an alternative embodiment, the controller may calculate a sum of cross-correlations between consecutive symbols, normalize the sum of the cross-correlations, and select N if the real number of the sum of the cross-correlations that have been normalized at N is equal to or greater than a predetermined threshold value.

Here, the threshold value may be a programmable value.

According to an embodiment, the receive device may be a receiver of a first base station for receiving a downlink channel of a second base station, and the receive signal may be a synchronization signal.

According to an alternative embodiment, the receive device may be a receiver that repetitively receives the same signal transmitted by a machine type communication (MTC) terminal, and the receive signal may be a signal transmitted by the MTC terminal.

Although preferred embodiments of the invention have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

The invention claimed is:

1. A method of operating by a receiving device in a wireless communication system, the method comprising:
    based on a plurality of identical signals being received repeatedly, performing symbol combining on a first group of N consecutive identical signals among the plurality of identical signals by increasing a value of N until a condition corresponding to N is met, where N is a natural number;
    based on determination that the condition corresponding to N is met, performing the symbol combining on a second group of M consecutive identical signals after the N consecutive identical signals among the plurality of identical signals by increasing a value of M until a condition corresponding to M is met, where M is a natural number; and
    performing energy combining on at least two symbol-combined groups including the first group and the second group,
    wherein the condition corresponding to N or M comprises (i) a first condition that a first metric value for the symbol combining corresponding to N or M is equal to or larger than 0 and a second metric value for the symbol combining corresponding to N+1 or M+1 is smaller than 0, or (ii) a second condition that a sum of cross-correlations corresponding to N or M is equal to or larger than a predetermined threshold value.

2. The method of claim 1, wherein each of the plurality of identical signals are configured based on at least a channel status, a transmit signal, or a noise.

3. The method of claim 1, wherein the first metric value or the second metric value is calculated using a first signal produced by combining up to a $K^{th}$ identical signal (here, K is a natural number) and a second signal as a $(K+1)^{th}$ identical signal.

4. The method of claim 1, wherein the threshold value is a programmable value.

5. The method of claim 1,
    wherein the receiving device is a receiver of a first base station receiving a downlink channel of a second base station, and
    wherein the plurality of identical signals comprise synchronization signals.

6. The method of claim 1, wherein the receiving device is a receiver for receiving a signal being repetitively transmitted by a machine type communication (MTC) terminal through an uplink channel.

7. A receiving device in a wireless communication system, the device comprising:
    a transceiver configured to transmit and receive signals; and
    a controller configured to:
        based on a plurality of identical signals being received repeatedly, perform symbol combining on a first group of N consecutive identical signals among the plurality of identical signals by increasing a value of N until a condition corresponding to N is met, where N is a natural number,
        based on determination that the condition corresponding to N is met, perform the symbol combining on a second group of M consecutive identical signals after the N consecutive identical signals among the plurality of identical signals by increasing a value of M until a condition corresponding to M is met, where M is a natural number, and
        perform energy combining on at least two symbol-combined groups including the first group and the second group,
    wherein the condition corresponding to N or M comprises (i) a first condition that a first metric value for the symbol combining corresponding to N or M is equal to or larger than 0 and a second metric value for the symbol combining corresponding to N+1 or M+1 is smaller than 0, or (ii) a second condition that a sum of cross-correlations corresponding to N or M is equal to or larger than a predetermined threshold value.

8. The device of claim 7, wherein each of the plurality of identical signals are configured based on at least a channel status, a transmit signal, or a noise.

9. The device of claim 7, wherein the controller is further configured to:
    calculate the first metric value or the second metric value using a first signal produced by combining up to a $K^{th}$ identical signal (here, K is a natural number) and a second signal as a $(K+1)^{th}$ identical signal.

10. The device of claim 7, wherein the threshold value is a programmable value.

11. The device of claim 7,
    wherein the receiving device is a receiver of a first base station receiving a downlink channel of a second base station, and
    wherein the plurality of identical signals comprise synchronization signals.

* * * * *